United States Patent [19]

Gutierrez

[11] Patent Number: 4,819,802
[45] Date of Patent: Apr. 11, 1989

[54] HOLDER AND EJECTOR ASSEMBLY FOR CASSETTE-TYPE CASINGS

[76] Inventor: Julian Gutierrez, 6205 SW. 116th St., Miami, Fla. 33156

[21] Appl. No.: 144,197

[22] Filed: Jan. 13, 1988

[51] Int. Cl.$^4$ .......................................... B65D 85/672
[52] U.S. Cl. ..................................... 206/387; 312/13; 221/87
[58] Field of Search ................ 206/387; 312/13, 245, 312/319; 221/87

[56] References Cited

U.S. PATENT DOCUMENTS

| | | | |
|---|---|---|---|
| 3,912,077 | 10/1975 | Kryniicki | 206/387 |
| 3,969,007 | 7/1976 | Lowry | 206/387 |
| 4,030,601 | 6/1977 | Ackeret | 206/387 |
| 4,162,112 | 7/1979 | Konkler | 206/387 |
| 4,239,109 | 12/1980 | Nielsen et al. | 206/387 |

Primary Examiner—Joseph Man-Fu Moy
Attorney, Agent, or Firm—John Cyril Malloy

[57] ABSTRACT

A holder assembly for the storage of a plurality of cassette-type casings of the type normally associated with audio or video cassettes or casings for compact disks wherein the holder assembly incorporates an ejector structure comprising a plurality of springs positionable into biasing engagement with the retained casings such that each of the casings may be independently and selectively positioned between a retained and stored position within the housing of the holder and an ejected position defined by the casing extending out of an open face of the housing for removal thereof. Selective disposition of each casing between the aforementioned positions is accomplished by applying proper force to an exposed surface portion of the casing itself in opposition to the biasing force exerted thereon by the ejector spring structure.

19 Claims, 6 Drawing Sheets

HOLDER AND EJECTOR ASSEMBLY FOR CASSETTE-TYPE CASINGS

BACKGROUND OF THE INVENTION

1. Field of the Invention

This invention is directed to an assembly for the storage of a plurality of cassette-type casings in a manner which permits exposure of a surface thereof on which a label or like information may be placed and which is further structured to facilitate ejection of at least a frontal portion of the casing out of the housing of the holder assembly for purposes of removal thereof wherein the construction of the assembly is characterized by a minimal amount of movable parts to accomplish storage, retention and ejection of the cassette-type casing all independent of one another.

2. Description of the Prior Art

With the advent and increased popularity of video and hi-fi stereo audio equipment, the use of audio and video cassettes have increased greatly. This, in turn, increases the need for efficient, aesthetically pleasing storage facilities for the retention of such cassettes. However, in order to be acceptable to the consumer, such storage facilities must independently store and allow for the removal of each of a plurality of cassettes, while at the same time exposing a labeled surface of the cassette for identification purposes. The prior art has responded to such need through the provision of storage racks or holders having separate parallel and immediately adjacent channels for the placement and retention of a single cassette in each channel so that a collection of such cassette-type casings normally may be oriented in either a substantially horizontal or vertical array. In more simplified designs of prior art storage facilities, there is provided no supplementary ejector means which could facilitate the removal of each of the cassette casings independently of one another. Accordingly, more complex structures have been devised which enable, through the pushing of a button or like activating member, the outward expulsion or ejection of a selected one of the cassette casings from its stored position within the holder assembly. While operable for its intended function, the more complex cassette holders of the type set forth above, are generally complex in nature resulting in an increased initial expense to the consumer, and sometimes, a shorter operable life or increased maintenance requiring repair of the various working parts of such complex structures. Typically, one holder for cassette-type casings incorporates the storage facilities to maintain over 20 cassettes in a single array. Each cassette is independently ejected from its stored position through the pressing of an exposed button. However, each ejection mechanism for each cassette comprises as many as nine moving parts. Therefore, it is readily seen that over 200 moving or working parts are incorporated in such a complex prior art structure. As set forth above, this results in increased initial cost of the item as well as the item being much more fragile such as when the holder assembly is accidentally dropped, and further, generally requiring more maintenance to maintain it in an operative condition.

To the contrary, there is a need in this area for a simplified holder assembly capable of storing a plurality of cassette-type casings (as well as other casing structures) in an aesthetically pleasing array. Each of the cassettes may be independently and selectively ejected from its stored position by applying pressure directly to the cassette and without disturbing the remainder of the cassettes and without requiring any push button or a plurality of complex working parts to accomplish such ejection. Such a preferred holder assembly should also have the increased versatility of being oriented in any of a plurality of positions while still being operable and safely retaining the cassettes within the holder thereby enabling its conformance to a specific storage space available for the placement of such a holder assembly. Such versatility further enables the orientation of the stored cassette in a position which facilitates the reading of the labels or identifying indicia.

SUMMARY OF THE INVENTION

The present invention is directed to a holder assembly for the storage of a plurality of cassette-type casings including but not limited to audio cassettes, video cassettes, and the rigid material casings in which compact discs are normally presented and packaged for retail sale. It should be emphasized, however, that the holder assembly of the present invention is structured to accommodate numerous other types of substantially rigid material casing structures which are intended to house computer tapes, floppy disks, and/or a variety of other types of products. For purposes of clarity, the structural details of the subject holder assembly will be described specifically with reference to a "cassette-type casing" which is intended to encompass numerous other types of casings of the type set forth above.

The holder assembly of the present invention comprises a housing having a base portion and two spaced apart, substantially walls extending outwardly therefrom and each of the two walls terminating in a free end. These free ends define an open face of the house sufficiently dimensioned to allow passage therethrough of the plurality of casings into and out of separate channel structures formed on the interior of the housing and structured to at least partially retain and orient the casings in a side-by-side parallel relation to one another. Further, the relative dimensions of the housing and the casings being stored are such as to allow exposure of a front surface portion on which labeling or other identifying indicia may be placed for the purpose of distinguishing the various cassettes from one another.

Each of the cassettes are independently positionable between a retained position and an ejected position. The latter or ejected position may be defined by a frontal portion of each cassette extending at least partially out through the open face of the housing a sufficient distance to allow gripping thereof by the fingers of one removing the cassette from the housing. To the contrary, the retained position is defined by a retention of the cassettes almost entirely within the interior of the housing such that only the exposed surface or frontal portion of the individual cassettes remain exposed for purposes of identifying the individual cassettes are set forth above.

Accordingly, the holder assembly of the present invention incorporates an ejector means in the form of a plurality of springs which are each positionable to engage at least one cassette at an inner portion thereof and at a location so as to provide a biasing force on each of the cassettes tending to position such cassettes out of the open face. A retention means is provided in the form of a retaining barrier-type flange disposed in a preferably fixed position along one periphery of the open face in substantially blocking relation to the plurality of channels in which the cassettes are retained. In a preferred embodiment, the retained position of each of the cassettes is accomplished by diagonally disposed portions or corners locked or retained engagement by "diagonally" disposed portions of the casing. More specifically, the retained position is further defined by a frontal peripheral portion of each of the cassettes disposed in abutting retained engagement with the retaining barrier flange of the retaining means, concurrently, the diagonally opposite interior surface of an opposite wall. The cassettes are maintained in this abutting engagement by virtue of the biasing force applied to an inner peripheral portion of each cassette by the spring element engaged in biasing relation therewith.

An important feature of the present invention is the minimal amount of working or operative parts used to accomplish ejection of the cassette from its stored and retained position, thereby overcoming many of the objections and disadvantages of the more complex prior art devices as set forth above. Selective positioning of the individual cassette between the retained position and the ejected position is accomplished by merely applying a force to the exposed outer peripheral portion of the cassette itself in a direction to oppose the biasing force applied to that cassette by the spring element of the ejector means. Therefore, dependent upon the location of application of force on the frontal or exposed portion of the cassette, it is moved either from its ejected position into its retained position or oppositely from its retained position into its ejected position. The ability to selectively orient each of the cassettes between the aforementioned ejected and retained positions is also dependent upon the cooperative configuration and dimensions of the interior of the housing relative to the dimensions and configurations of the cassette. The cassette is maintained within the aforementioned retaned position and under the biasing force of the engaging ejector spring element or alternately removed therefrom by effectively pivoting the inner portion of each cassette about the point of engagement between the cassette and the free end of the spring element.

A further ability evidencing the versatility of the holder assembly of the present invention is the capability of the ejection structure of the present invention being operative and yet safely retain the cassettes when the housing is oriented into any one of a plurality of horizontal, vertical upright or inverted positions or even when the open face and the cassettes are directed vertically downward. The cassettes are safely maintained in a stored position, if desired, and selectively removable from the housing regardless of its orientation as long as the open face of the housing remains exposed.

The spring means comprising the plurality of spring elements associated with each of the plurality of casings stored within the housing may be made from a variety of materials but should be inherently flexible. The material from which said spring elements are formed, their longitudinal and transverse dimensions and their specific orientation relative to the inner portions of the cassettes which are engaged and the inner portions of the housing to which the spring elements are connected are dependent upon a variety of factors including, but not limited to, size, weight and configuration of the casing, and frictional resistance between the casing and the inner surfaces of the housing as it is disposed between the aforementioned retained position and ejected position.

The invention accordingly comprises the features of construction, combination of elements and arrangement of parts which will be exemplified in the construction hereinafter set forth, and the scope of the invention will be indicated in the claims.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
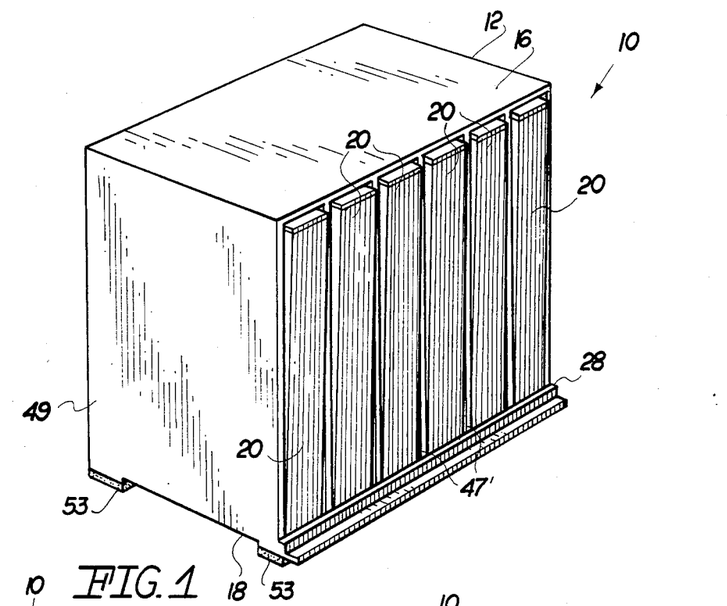
FIG. 1 is a perspective view of one embodiment of the holder assembly of the present invention.

As shown in FIG. 1, one embodiment of the present holder assembly is generally indicated as 10 and comprises a housing 12 having a base portion 14 which, depending upon the orientation of the housing 12 may be considered a rear wall. The housing 12 further includes two outwardly extending walls 16 and 18 having one end as at 16' and 18' fixedly secured to the base portion 14 and extending outwardly therefrom in substantially spaced, parallel relation to one another. Each of the walls 16 and 18 include correspondingly positioned opposite ends 16" and 18" which are disposed in spaced apart relation to one another and may be considered free ends. The disposition of such free ends 16" and 18" define what may be referred to as an open face of the housing 12 through which any one of a plurality of cassette-type casings 20 may pass. Accordingly, as clearly shown in FIGS. 1, 2 and 3, the individual cassette-type casings 20 may be selectively positionable, independently of one another, between a retained position, as represented in solid lines in FIGS. 1 and 2, and an ejected position, as represented in solid lines in FIG. 3, wherein at least a frontal portion thereof 20' projects outwardly from the open face of the housing 12 a sufficient distance to allow gripping thereof by the fingers 22 of one utilizing the holder assembly 10.

The holder assembly 10, therefore, clearly includes an ejector assembly comprising a spring means generally indicated as 24. The spring means, in the preferred embodiment as shown in FIGS. 1 through 4, comprises a plurality of spring elements 26 disposed in spaced apart relation to one another and extending outwardly from the inner surface of the base portion 14 into engageable, biasing relation with an inner surface portion or edge 23 of the individual casings 20. The ejector assembly of the present invention also may be considered to include a retaining means in the form of a retaining barrier flange 28 preferably fixed along a periphery of the open face of housing 12 and being essentially oppositely disposed to the base portion 14. The barrier flange 28 of the retaining means extends the length of the open face and is further positioned in blocking, interruptive engagement to the outward passage of the individual casings 20 as clearly shown in FIGS. 1 and 2. The barrier flange 28 may be considered to be secured to and extend outwardly from the wall 18 into "catching" interruptive, blocking engagement with the lower peripheral portion as at 29 of the individual casings 20.

In the embodiment of FIGS. 1 through 4, it should be readily apparent, therefore, that a retaining position of the individual casings 20 within the interior of the housing is defined by a biasing force being applied to the casing by the engagement of an individual spring element 26 with an inner portion of the casing as at 23. This biasing force serves to effectively maintain interruptive engagement between the lower peripheral portion 29 with the barrier flange 28 thereby serving to "wedge" the casing 20 within the interior of the housing 12 in the aforementioned retained position. Such wedging action further is defined by an inner surface portion of the casing as at 31 being forced against the inner surface of the opposite wall 16 relative to wall 18 as clearly shown in FIG. 2.

Figure 2:
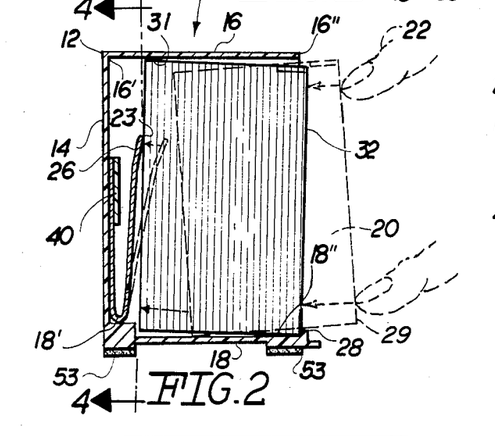
FIG. 2 is an interior transverse sectional view of the embodiment of FIG. 1.
Figures 3, 5:
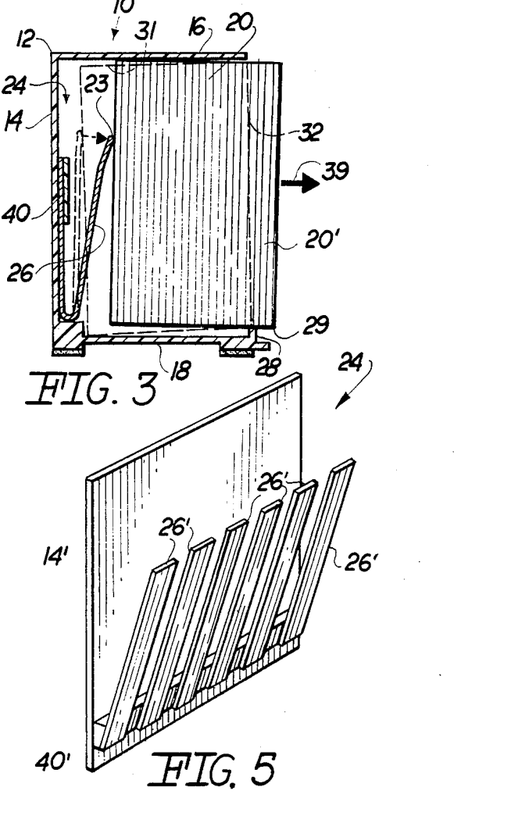
FIG. 3 is a sectional view similar to that of FIG. 2 wherein one cassette is being moved to an ejected position.
FIG. 5 is a perspective detailed view of a spring assembly associated with a base portion of the housing.
Figure 4:
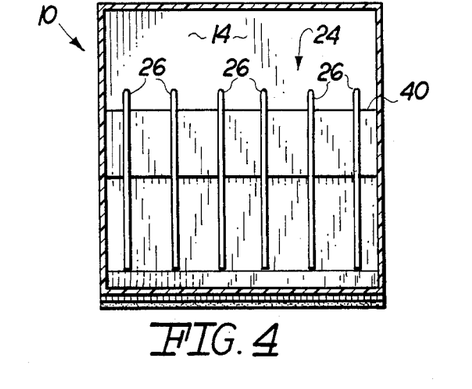
FIG. 4 is a longitudinal sectional view alone line 4—4 of FIG. 2.

In operation, each of the individual cassette-type casings 20 may be selectively positionable between a retained position, represented in solid lines in FIGS. 1 and 2 and phantom lines in FIG. 3, and an ejected position, represented in phantom lines in FIG. 2 and solid lines in FIG. 3. The cassette may itself be considered part of the ejector means. More specifically, the application of force to a frontal surface as at 29 by a finger of a user or the like 22 serves to direct the casing 20 against the biasing force exerted thereon by an individual spring element 26 and effectively towards the end 18' of the wall 18 as indicated by the phantom representation of casing 20 in FIG. 2. Once the lower peripheral portion 29 of the casing 20 is disposed beyond and inwardly of the retaining barrier flange 28 and is retained thereby, the inner surface portion or edges 23 of the casing 20 effectively "pivots" about its point of engagement with the spring element. Again, due to the exertion of biasing force thereon, such frontal peripheral portion 29 is effectively retained by the barrier flange 28 in the manner shown in solid lines in FIG. 2. At the same time, and again due to the biasing force exerted on the casing 20 by the spring 26, the inner portion as at 31 effectively wedges against the inner surface of the wall 16 as also represented in FIG. 2 in solid lines.

To remove the casng 20 from its retained position or selectively dispose it in its ejected position as represented in solid lines in FIG. 3, a force is exerted on the frontal portion as at 32 of the casing 20 by the finger 22, again causing the inner portion at a location engaged by the spring element 26 to effectively "pivot" about the point of engagement with spring element 26, thereby causing the lower peripheral portion 29 to travel above and out of blocking engagement with the barrier flange 28 and concurrently cause the inner portion as at 31 to be removed from its wedged position relative to the inner surface of the wall 16. As represented by directional arrow 39, the cassette casing 20 thereby travels out through the open face of the housing 12 due to the release of the force exerted on the outer portion 32 of the casing by finger 22 and concurrently, the biasing force being exerted on the inner portion 23 by the spring element 26.

In order to facilitate operation of the subject structure to the extent of positioning the cassettes into or out of the casing, color coded indicators may be added to the holder assembly 10. More specifically an outer surface portion as at 16" could include a green marking (release) and an outer surface portion of the barrier flange 28 could be marked red for insertion of the casing 20.

Additional details of the spring means 24 and/or 24' include the spring elements 26 and/or 26' having an elongated, finger-like configuration extending angularly outward from the base portion 14 or 14' to which it is attached into engaging relation with an inner surface portion of the casing or casings disposed within the housing 12. Depending upon the embodiment of the present invention, the point of engagement as at 23 (see FIGS. 2 and 3) may be along the transverse center or off-center closer to the wall 16 or alternately, off-center closer to the wall 18. Further, the spring elements themselves as at 26 or 26' may be made from metal, plastic, or like material having an inherent flexibility when so structured and configured as shown in FIGS. 1 through 8. Their length, transverse dimension, size, tension strength, flexibility, etc. may be varied and dependent upon many factors. Such factors may include, but are not limited to, size, configuration and weight of the cassette-type casings 20 being stored and the amount of friction between the inner surfaces of the housing 12 and the casing 20 as it slides relative thereto. Further, rather than being specifically attached by connectors, adhesives, etc. as at 40 or 40' as shown in FIGS. 1 through 5, the various spring elements 26 or 26' may be integrally attached to the base portion 14 or 14' as by being cut-out therefrom and extended in the aforementioned angular outwardly extending orientation.

Figures 6, 7:
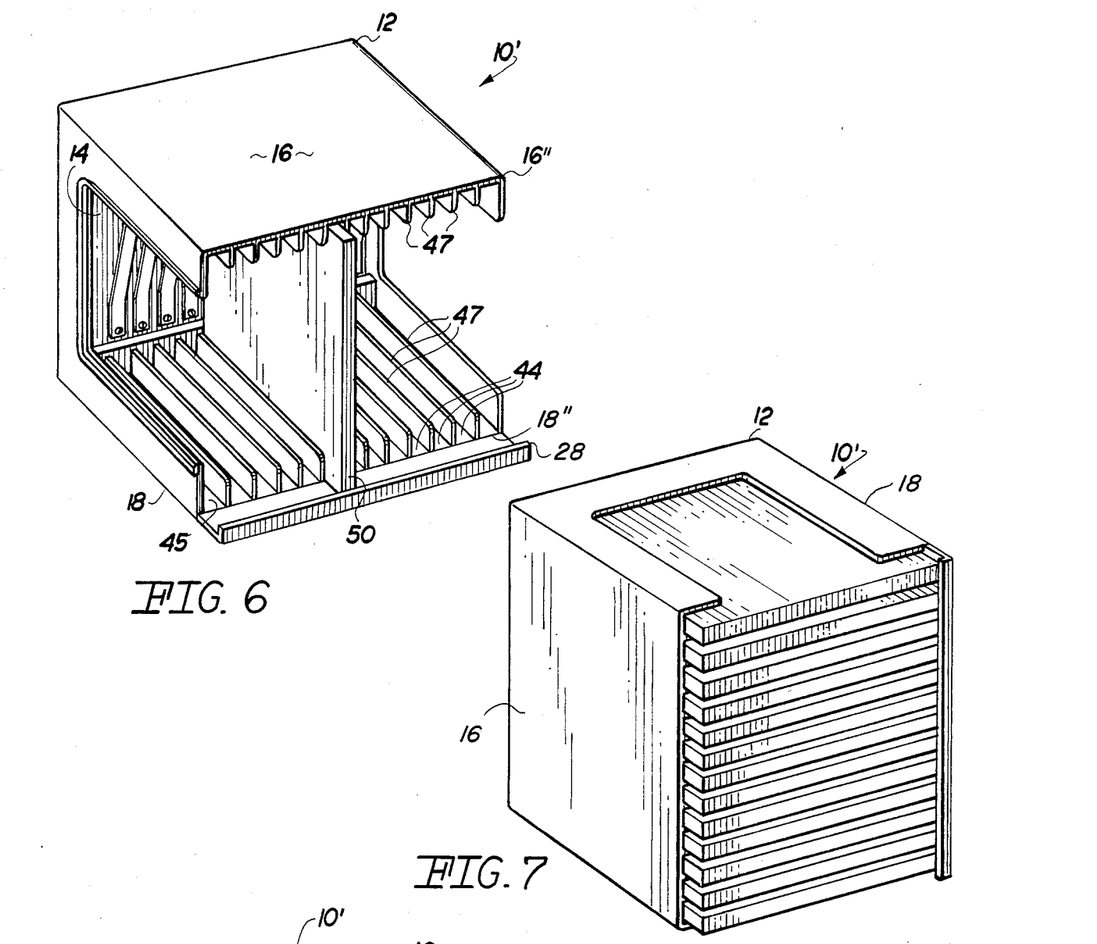
FIG. 6 is another embodiment of the holder assembly of the present invention wherein the cassettes are arranged in a vertical array.
FIG. 7 is a perspective view of the embodiment of FIG. 1 wherein the cassettes being stored are arranged in a horizontal array.
Figure 8:
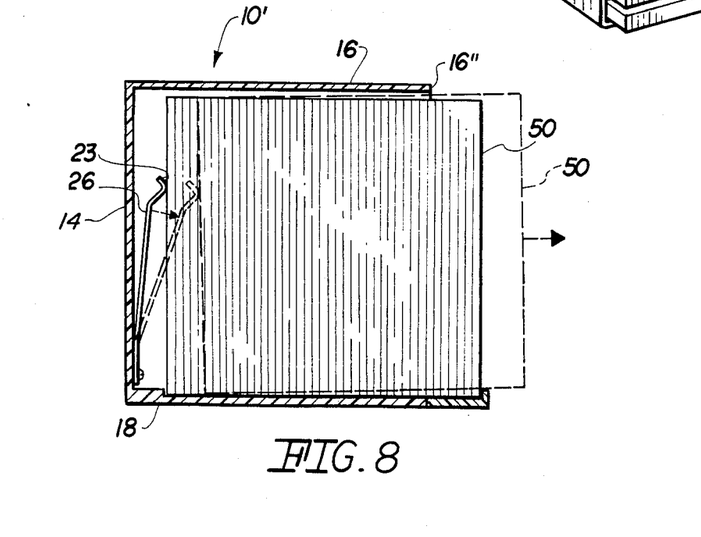
FIG. 8 is a transverse sectional view of FIG. 6 with the cassette maintained in a retained position in solid lines and in an ejected position in phantom lines.
Figure 9:
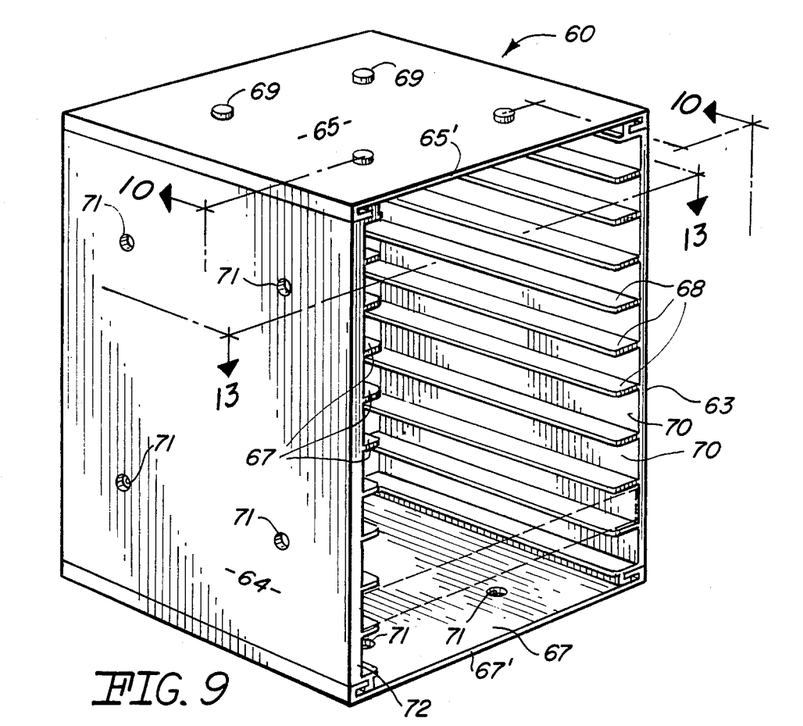
FIG. 9 is a perspective view of yet another embodiment of the present invention.

Other structural features associated with the embodiment of FIGS. 1 through 4 as well as the embodiment of FIGS. 6 through 8 include the provision of channel means including a plurality of individual channels 44. Each of the channels are disposed in adjacent, side-by-side relation to one another and have an open outer end as at 45 disposed adjacent to the retaining or barrier flange 28. The channels 44 are defined by a plurality of oppositely disposed partitions 47 formed on at least one inner surface of one wall as at 18 or, as shown in the embodiment of FIG. 6, shown formed on the inner surface of both walls 16 and 18 and in coplaner relation to one another. Therefore, the individual channels 44 are each designed to receive one cassette-type casing 20 or 50 therein and effectively retain and at least partially enclose at least one peripheral edge of the casing as clearly shown in FIG. 6. The plurality of channels 44 being disposed in transverse relation to the barrier flange 28 serves to effectively position the casings 20 or 50 into interruptive retaining engagement with the barrier flange 28 thereby maintaining each of the casings in the retained position when so desired. The embodiment of FIG. 6 shows the channels 44 being formed by spaced apart partitions 47 formed on the inner surface respectively of the walls 16 and 18. To the contrary, the partitions 47' may comprise full segregated partitions in the form of panels similar in dimension and configuration to side wall 49 also of the embodiment of FIG. 1. As shown in FIG. 6, the side wall is effectively opened to provide further access. Also, the open face of the housing 12 is such as to allow clear observation of the exposed surface portion of each of the casings 20 and any labeling or informative indicia thereon. Support structures as at 53 and 55 may also be formed on the appropriate surfaces of the housing 12 in order to facilitate mounting or orientation of the housing in a horizontal or vertical position and also in a position which orients the base portion 14 on a supporting surface and the open face such that the individual cassette-type casings are removed therefrom in a outward vertical extension through such open face.

Another structural modification possible in each of the embodiments herein, but not shown for purposes of clarity, is the disposition further inwardly of the flange, as at 28 in FIGS. 1–3. This would prevent the outer protrusion of the cassettes through the open face and the possibility of covering the open face with a lid, cover, door, etc.

Another embodiment of the present invention is primarily represented in FIGS. 9 through 15 wherein the holder assembly 6 includes a base portion 62 similar to base 14 in the embodiment of FIG. 1. An oppositely disposed walls 64 and 66 having a plurality of partitions or portion segments 67 and 68 integrally or otherwise formed on interior portions thereof for the purpose of forming a plurality of spaced apart, parallel channels 70 in which the casings or cassettes 20 are placed. A retaining or barrier flange 72 is secured to and extends along the length of one free opposite end of the one wall 64 in blocking or interruptive engagement with the outer peripheral end of the casings and serves the functions similar to that of the barrier flange 28 described with regard to the embodiments of FIGS. 1 through 8. End panels 65 and 67 serve to enclose the interior of the housing of the holder assembly 60 for the containment and protection of any one or a plurality of casings 20 (not shown) positioned therein within channel 70. The opposite free ends of the walls 16 and 18 form the open face of the housing through which the casings 20 may pass. Similarly, the correspondingly positioned peripheral edges 65' and 67' are also correspondingly positioned to define boundaries of the open face.

Figures 10, 11, 12:
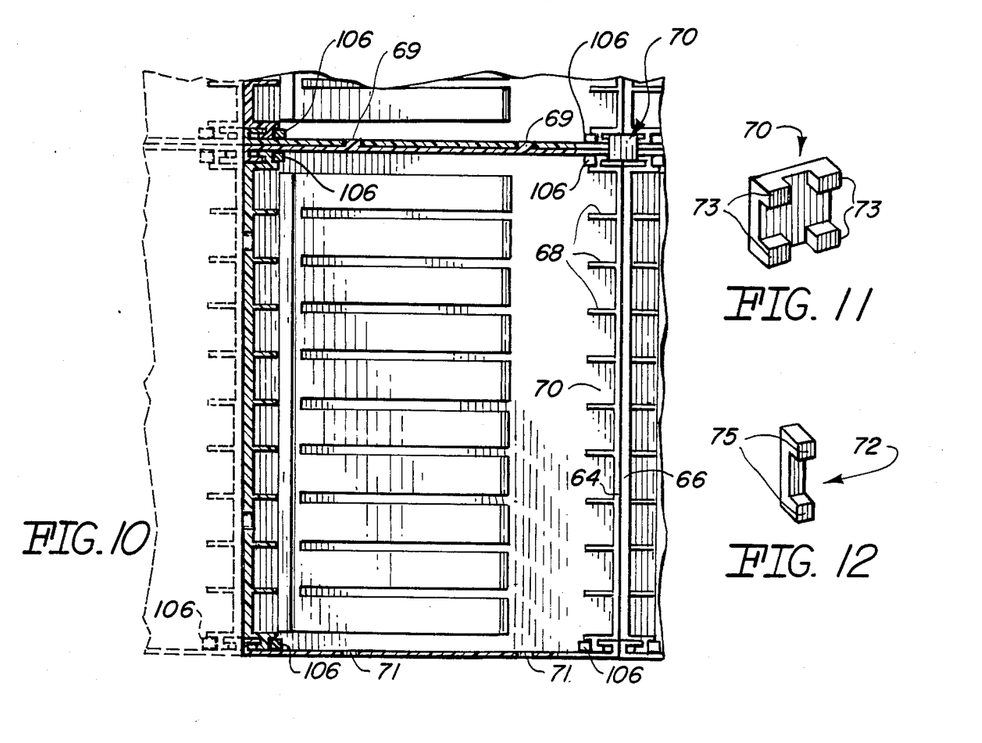
FIG. 10 is a sectional view of the interior of the embodiment of FIG. 9 as taken alone line 10—10 of FIG. 9.
FIG. 11 is a perspective view of a connector element serving to removably attach correspondingly positioned corners of separate ones of the casing structures of the type of the embodiment of FIG. 9.
FIG. 12 is a perspective view of another embodiment of a connector structure serving a function similar to that of the structure of FIG. 11.

As shown in FIG. 2, a plurality of the housings may be grouped together in stacked, side-by-side orientation in order to accommodate a greater number of casings 20 to be stored. In order to facilitate such adjacent interconnection with one another, a plurality of protrusions as at 69 may be formed on the outer surface of at least one, but preferably two, members forming the housing such as on panel 55 and wall 62. Similarly, oppositely disposed wall or panel portion 64 and 67, respectively, include cooperatively dimensioned and correspondingly disposed apertures 71. When two or more of the housings of the subject holder assembly 60 are brought into mating engagement with one another, the outer projection 69 of course fits within and frictional engage and mate on the interior of the aperture 71 of the confronting panel or wall members. Connectors such as at 70 and 72 in FIGS. 11 and 12 include a plurality of outer projections 73 or alternately 75 which may overlap and interengage correspondingly positioned mating peripheral edges as of adjacently disposed and interconnected housings of the various holder assemblies 60 as shown in FIG. 10.

As shown in FIGS. 14 through 20, this embodiment includes the ejector assembly in the form of a biasing, ejector spring, generally indicated as 74 and including a plurality of spaced apart spring fingers 76 each extending outwardly from an inner surface 62' of the base 62 and secured thereto by a number of constructions defined in various embodiments herein. In the embodiment of FIGS. 13 through 17, the spring means 74 includes a base portion 75 integrally secured to and common with all the outwardly extending inclined fingers 76 (see FIG. 13) and including a connecting flange 77 having one or more cut-out portions 79 therein being secured thereto and extending along the length of the spring means 74. The connecting flange 77 is specifically dimensioned and configured to fit within a joint as at 78 (see FIGS. 16 and 20) for snug, fixed frictional engagement therewith wherein the joint comprises an elongated insert 80 press fit within the elongated channel 82 in overlapping relation to the flange 77 as shown.

Figures 13, 20:
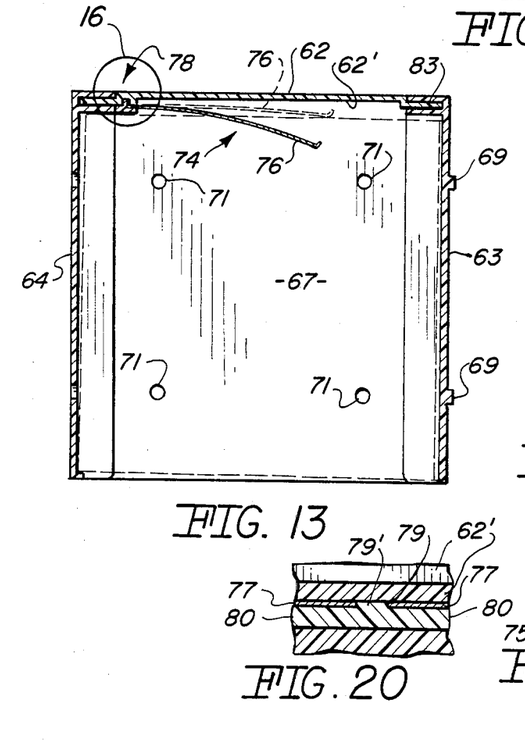
FIG. 13 is a sectional view along line 13—13 of FIG. 9.
FIG. 20 is a sectional view along line 20—20 of FIG. 16.
Figures 14, 15, 16:
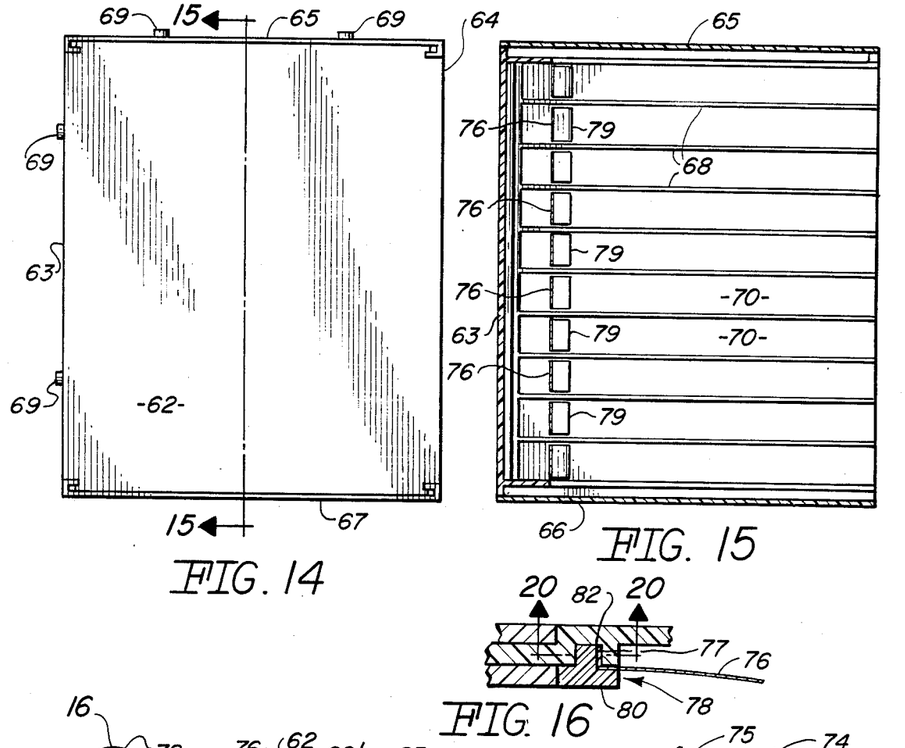
FIG. 14 is a rear view of the embodiment of FIG. 9.
FIG. 15 is a longitudinal sectional view showing the interior details of one inner surface of the embodiment of FIG. 9 and taken along line 15—15 of FIG. 14.
FIG. 16 is a sectional view in partial cut-away of a structure for attaching the ejector assembly of the present invention as taken along line 16—16 of FIG. 13.
Figure 17:
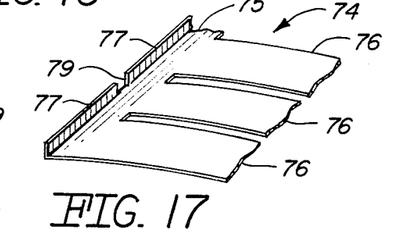
FIG. 17 is a perspective view in partial cut-away showing structural details of the ejector assembly of the present invention.

Removal of the spring can easily be accomplished by removal of the elongated insert 80 since the connecting flange 77 is maintained in its operative position as shown in FIG. 13 by the presence of such insert 80 in overlapping relation to the connecting flange 77.

As should also be emphasized with regard to the embodiment of FIG. 13, the base 62 is removably connected to appropriately positioned ends of the wall 63 and 64 rather than being fixedly secured thereto as in the embodiment of FIG. 1. Such interconnection may occur by recessed outwardly existing flange or tongue portions 83 fitting within receiving grooves 85 as best shown in FIG. 13 and as will be explained in greater detail hereinafter.

In each of the embodiments of the present invention, the wedging action provided by the free ends or extremities of the spring fingers on the inner peripheral edge or surface of the casings is the same in each of the embodiments wherein the casings in effect pivot about the point of engagement of the free ends of each of the spring fingers 76 into a wedging action between the inner surface of the retaining flange 72 and a diagonally opposed inner surface portion of the opposing wall 63.

Figures 18, 19:
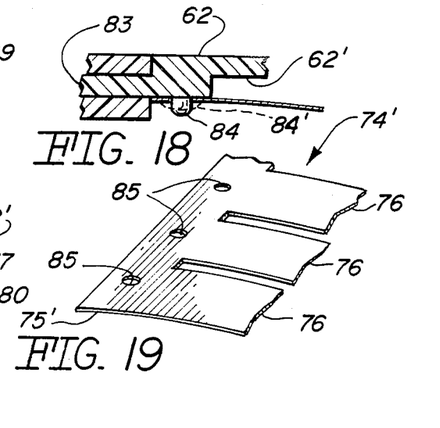
FIG. 18 is a sectional view in partial cut-away showing another embodiment of the ejector assembly.
FIG. 19 is a perspective view in partial cut-away showing structural details of a portion of the ejector assembly.

Another embodiment of the spring means as at 74' as shown in FIGS. 18 and 19 which may be used with the structural embodiment of FIGS. 9 through 15 of the holder assembly includes the formation of a plurality of apertures in the base 75' of the spring means 74' as at 85. Such apertures are exposed in spaced apart relation to one another and designed to fit around initially outwardly extending projections 84. Such projections 84 are formed of a heat susceptible material plastic which when subjected to heat will effectively melt and flatten about the outer surface of the base 75 as represented in phantom lines as 84' in FIG. 18. In such an embodiment, the spring means 74' is permanently and fixedly secured to the inner surface generally in the position as shown in FIG. 13. Further, with regard to FIG. 13, the representation of the spring finger 76 in solid lines represents the position when such spring fingers are not biased or in engagement with the inner edge portions of the casings. However, when so biased, the spring finger 76 will assume a more flattened position represented in phantom lines in FIG. 13. It should again be emphasized that in each of the embodiments 74 and 74' the spring fingers 76 are integrally formed to base 75 and from a common metallic or applicable inherently flexible material.

Figure 21:
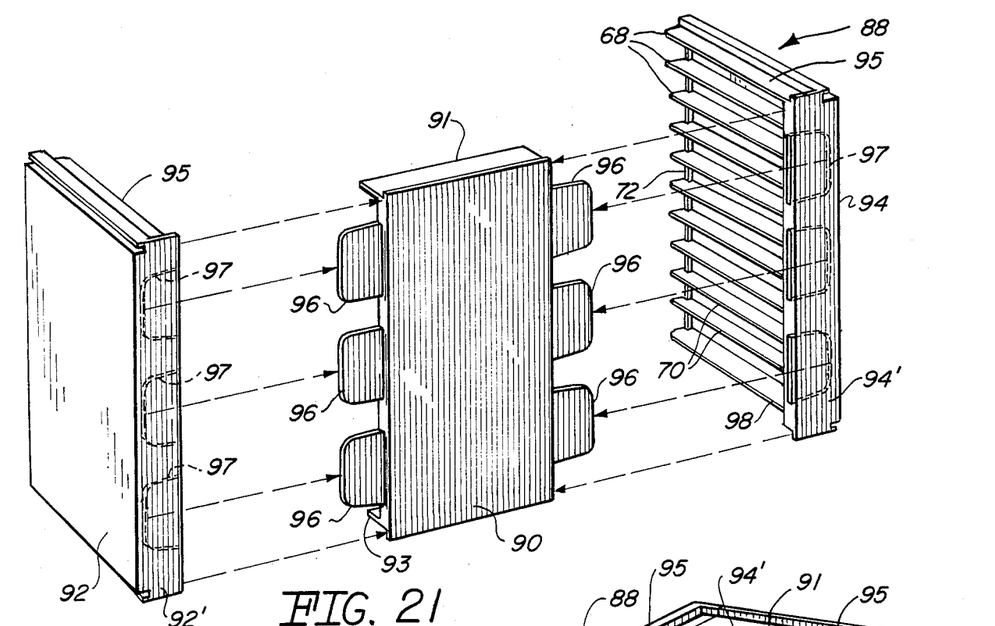
FIG. 21 is a perspective view in exploded format of yet another embodiment of the present invention.
Figure 22:
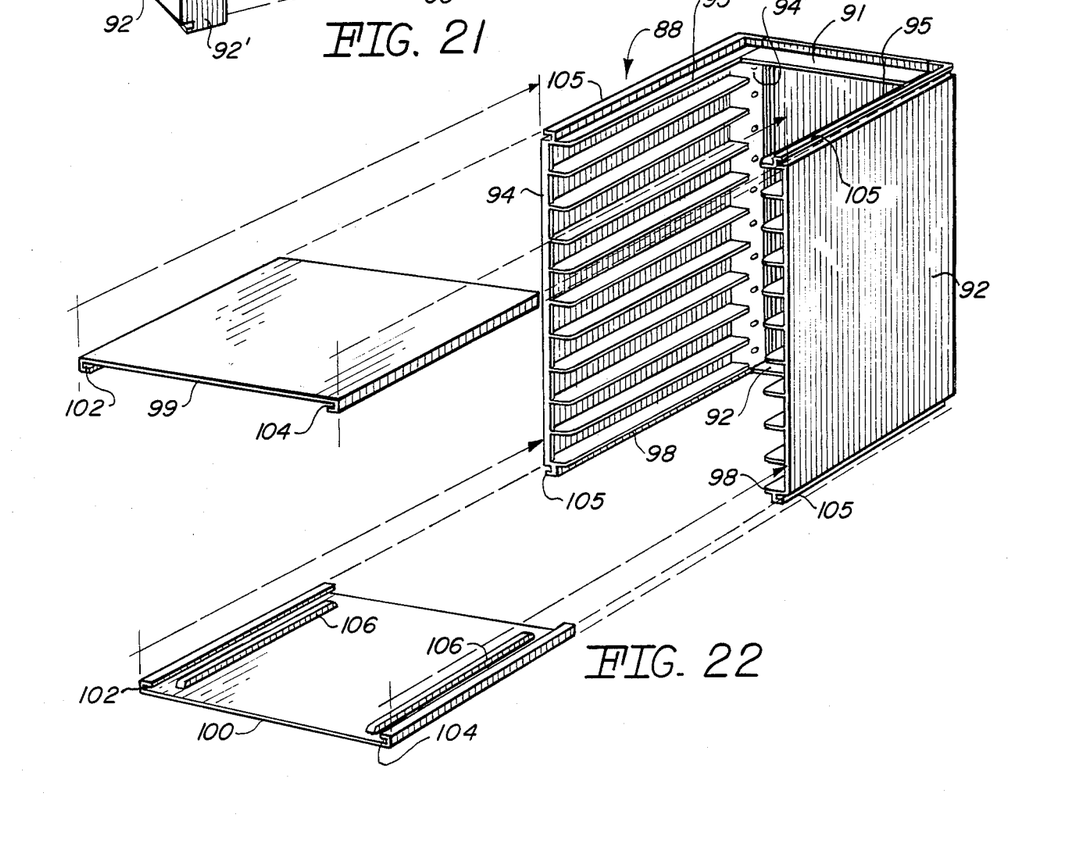
FIG. 22 is a perspective view in exploded format of the at least partially assembled structure of the embodiment of FIG. 21.

FIGS. 21 and 22 represent yet another structural embodiment of the holder assembly of the present invention generally indicated as 88 and includes a base portion 90 structured cooperatively with wall portions 92 and 94 so as to be removably attached thereto and yet provide a strong structural engagement so as to give the "feel" of being permanently attached to the entire holder assembly 88. Such is accomplished by the integral formation of a plurality of outwardly extending ears or flanges 96 preferably disposed in spaced apart relation to one another as clearly shown in FIG. 21. Such flanges fit within sockets 97 in a press-fit, frictional engagement in the rear base portion 92' and 94' of the walls 92 and 94, respectively. The opposite ends of the base 90 includes outwardly extending flanges as at 91 and 93 designed to meet and be coplaner with similarly disposed outwardly extending flanges 95 and 98 formed on each of the walls 92 and 94. Further structural integrity is provided by end panels 99 and 100 being secured in the manner shown in FIG. 22 by elongated track portions 102 and 104 formed at each opposite longitudinal end thereof. Such track portions are designed to surround the slidingly and frictionally engage the correspondingly positioned mating flanges 105 formed where indicated on the walls 92 and 94 of FIG. 22. Therefore, a "knock-down" easily collapsible structure is formed such that packing and shipping of the container in its unassembled form may take considerably less space and therefore save considerable transportation expenses. Also, in case one of the parts such as the walls 92 or 94 are damaged, the damaged portion can be replaced without total replacement of the entire unit. Additional brace ribs 106 may be provided as indicated in FIG. 22 to further strengthen and add structural integrity to the mating engagement of the end panels 99 and 100 in the manner shown in FIG. 22.

Figure 23:
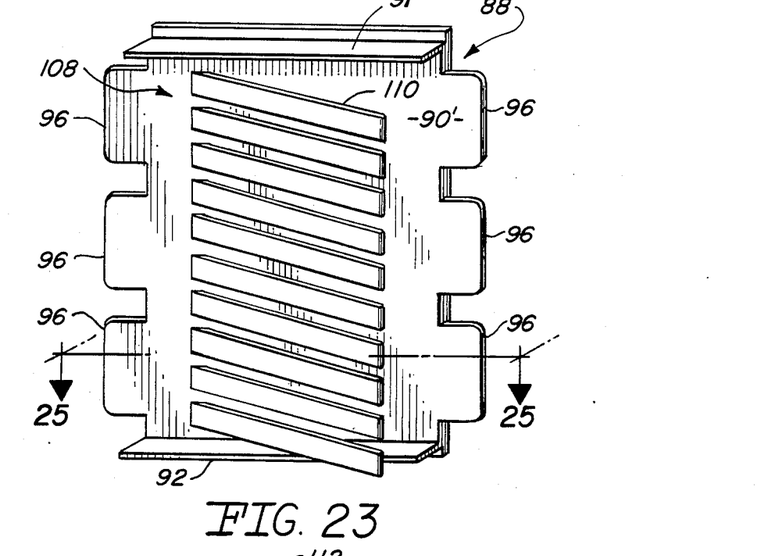
FIG. 23 is a perspective view of one embodiment of a portion of the ejector assembly.
Figure 25:
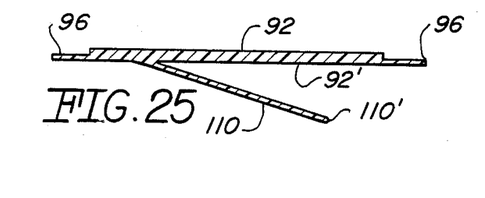
FIG. 25 is a sectional view along line 25—25 of FIG. 23.
Figure 26:
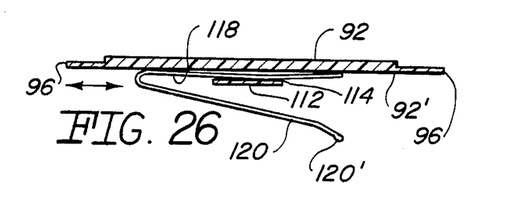
FIG. 26 is a sectional view along line 26—26 of FIG. 24.

With regard to FIGS. 23 and 26, various structural embodiments of the spring means generally indicated as 108 and 108' may be utilized depending upon the particular application for which the subject holder assembly 88 may be used. In one embodiment shown in FIGS. 23 and 25, the spring means 108 comprising the plurality of spring fingers 110 are integrally formed to the base 90 and extend in an angle outwardly diverging relation as best shown in FIGS. 23 and 25. The free ends as at 110' serves to engage the inner peripheral edge of the casings as was explained in greater detail above with regard to the embodiment of FIG. 1.

Figure 24:
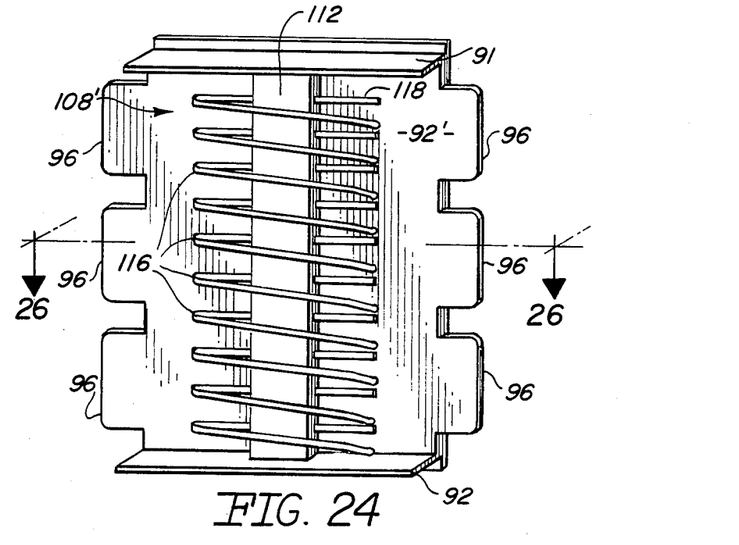
FIG. 24 is a perspective view of yet another embodiment of the ejector assembly of the present invention.

With regard to the embodiment of FIGS. 24 and 26, the base 92 has formed thereon a mounting rib 112 extending along the length thereof as shown in FIG. 24. The mounting rib 112 may have a plurality of apertures or channels as at 114 between it and the inner surface 92' of the base 92 or alternately may be spaced substantially along its length. In either embodiment, the spring means 108' comprises a plurality of spaced apart individual spring elements 116 having an anchoring leaf or leg 118 slidingly and frictionally positioned within the slot or aperture 114 such that its opposite biasing leg 120 extends angularly outwardly therefrom as best shown in FIG. 26. The free end thereof as at 120' serves to pivotally and biasingly engage the inner peripheral edge of the casing 20 as described with regard to the embodiment of FIG. 1. One added feature with regard to the spring means 108' is the adjustability of the position of the various spring elements 116. The adjustability may occur as indicated by the directional arrow of FIG. 26 such that the anchoring leg 118 may effectively be slid along its length between the anchoring rib 112 and the inner surface 92 of the base 92. This will have of course the effect of varying the position of engagement of the free end 120 with the inner peripheral edge of the casing. It has been found that the closer the point of engagement of the free end 120' of the spring finger or element 120 is with the transverse center of the casing, the left wedging force or holding force will be exerted on the casing. However, in certain applications, a much greater holding or gripping force is preferred to be exerted on the casing. In such instance, the various spring elements may be disposed such that the free end 120 prime is disposed closer to the inner surface of the wall 92 (see FIGS. 21 and 22) which is no directly associated with the barrier or retaining flange 72 which serves to abut and interrupt the outer peripheral end portion of the casings maintained within any one of the channels as it attempts to exit the open face. Such stronger holding or gripping or wedging force being exerted on the casings is preferred in situations where the holder assembly 88 (or any of the other embodiments described herein) may be in an environment which is subjected to more vibration such as in an airplane, boat, automobile, etc. Obviously, the holding force can be increased without the feature of adjustability as shown with regard to the embodiment of FIGS. 24 and 26 by merely adding to the inherent biasing force of the spring elements such as by increasing the material or increasing the inherent resiliency or flexibility of the material from which the various spring elements are formed.

Now that the invention has been described, what is claimed is:

1. A holder assembly for the storage and dispensing of a plurality of casings such as, but not limited to, audio or video cassettes, said assembly comprising:
   a. a housing having a base portion, two wall portions and two end portions each connected at one end to said base portion and extending outwardly therefrom in spaced, substantially parallel relation to one another,
   b. said two wall portions and said two end portions extending outwardly from said base an equal distance and having substantially correspondingly positioned outer opposite ends disposed in spaced apart relation and at least partially defining an open face of said housing,
   c. said open face oppositely disposed relative to said base portion and extending along a length of said housing and dimensioned and disposed to expose an outer portion of any of a plurality of casings within said housing,
   d. a plurality of channel means formed within said housing and extending between said base portion and said open face for retention of the plurality of casings in spaced and adjacent relation to one another,
   e. a retaining means for maintaining the plurality of casings within said housing and comprising a flange structure secured to one of said two walls and disposed adjacent to open end of each of said plurality of channel means,
   f. said flange structure extending outwardly from said one wall in substantially blocking relation to a front peripheral end portion of each casing exiting any of said channel means through said open face and having a length sufficient to connect to said two end portions and extend continuously therebetween,
   f. an ejector assembly comprising a spring means for biasing the plurality of casings towards and out of the open face, said spring means comprising a plurality of spring elements each extending outwardly from an inner surface of said base portion and into engagable relation with each of the casings within separate ones of said plurality of channel means,
   g. said plurality of spring elements being disposed to engage the inner portion of a correspondingly positioned one casing at a proximate transverse center thereof but between said transverse center and one end of the casing disposed closest to said one wall furthest from said retaining means,
   h. said spring means disposed to force the plurality of casings into interruptive, abutting engagement with said retaining means to define a retained position thereof, and
   i. said spring means disposed and said housing cooperatively dimensioned both relative to said plurality of casings to define an ejected position of the casing, said ejected position further defined by an extension of an outer portion of the casing beyond said retaining means and out of said open face.

2. An assembly as in claim 1 wherein each of said plurality of channel means comprises a channel structure disposed in parallel and adjacent relation to one another and each disposed in transverse relation to said flange structure adjacent an open end of said plurality of channel structures.

3. An assembly as in claim 2 wherein each of said channel structures comprise parallel, spaced apart partitions secured to an inner surface of at least one of said two walls and each having an elongated configuration extending from said base portion outwardly toward said open face.

4. An assembly as in claim 3 wherein each of said partitions extend outwardly from said wall portion to which it is secured a sufficient distance to at least partially enclose and retain a peripheral edge of said one casing and a respective one of said channel structures.

5. An assembly as in claim 4 wherein partitions defining each channel is formed on an inner surface portion of both of said two walls in aligned relation to one another, said partitions disposed to enclose and retain opposite peripheral edges of one casing in a respective one of said channel structures.

6. An assembly as in claim 1 wherein said retaining position is further defined by one retained casing having a front peripheral end portion disposed in abutting relation to said retaining means and a substantially diagonally opposed inner peripheral edge disposed in substantially parallel relation to one of said two walls oppositely disposed relative to said retaining means.

7. A holder assembly for the storage and dispensing of a plurality of casings such as, but not limited to, audio or video cassettes, said assembly comprising:
   a. a housing having a base portion and two wall portions each connected at one end to said base portion and extending outwardly therefrom in spaced, substantially parallel relation to one another,
   b. said two wall portions having substantially correspondingly positioned outer opposite ends disposed in spaced apart relation and at least partially defining an open face of said housing,
   c. said open face oppositely disposed relative to said base portion and extending along a length of said housing and dimensioned and disposed to expose an outer portion of any of a plurality of casings within said housing,
   d. a plurality of channel means formed within said housing and extending between said base portion and said open face for retention of the plurality of casings in spaced and adjacent relation to one another,
   e. a retaining means for maintaining the plurality of casings within said housing and formed thereon adjacent a periphery of said open face and extending the length thereof in substantially transverse relation to said plurality of channel means,
   f. an ejector assembly comprising a spring means for biasing the plurality of casings towards and out of the open face, said spring means comprising a plurality of spring elements each extending outwardly from an inner surface of said base portion and into engagable relation with each of the casings within separate ones of said plurality of channel means, each of said plurality of spring elements engaging at least one of said casings at a location which biases the one casing into either said retained position or said ejected position dependent on an opposing force being first applied to the casing along an outer, exposed portion thereof,
   g. said plurality of spring elements being adjustably mounted along their respective lengths on the inner surface of said base portion and selectively positionable along their lengths so as to vary the point of engagement of a distal free end of each spring element with the inner portion of a correspondingly positioned casing, h. said spring means disposed to force the plurality of casings into interruptive, abutting engagement with said retaining means to define a retained position thereof, and i. said spring means disposed and said housing cooperatively dimensioned both relative to said plurality of casings to define an ejected position of the casings, said ejected position further defined by an extension of an outer portion of the casing beyond said retaining means and out of said open face.

8. An assembly as in claim 7 wherein at least some of said spring elements are disposed to engage the inner portion of one casing at a location between the transverse center thereof and one end thereof disposed closest to said one wall associated with said retaining means.

9. An assembly as in claim 7 wherein at least some of said spring elements are disposed to engage the inner portion of one casing at a location between the transverse center thereof and one end thereof disposed farthest from said one wall associated with said retaining means.

10. An assembly as in claim 7 wherein said plurality of spring elements are equal in number to said plurality of channel means and in aligned relation therewith.

11. An assembly as in claim 10 wherein each of said spring elements are secured to said base portion and extend outwardly therefrom into engageable, biasing relation to one of the casings in aligned one of said channel means.

12. An assembly as in claim 11 wherein each of said spring elements comprise an elongated finger formed of a flexible material and extending angularly outward from said base portion into engageable relation with one of the casings at a free end of each finger.

13. An assembly as in claim 12 wherein said fingers are integrally secured to said base portion and comprise an integral, one-piece construction therewith.

14. A holder assembly for the storage and dispensing of a plurality of casings such as, but not limited to, audio or video cassettes, said assembly comprising:

a. a housing having a base portion and two wall portions each removably connected at one end to said base portion and extending outwardly therefrom is spaced, substantially parallel relation to one another, b. said two wall portions having substantially correspondingly positioned outer opposite ends disposed in spaced apart relation and at least partially defining an open face of said housing, c. said open face oppositely disposed relative to said base portion and extending along a length of said housing and dimensioned and disposed to expose an outer portion of any of a plurality of casings within said housing, d. a plurality of channel means formed within said housing and extending between said base portion and said open face for retention of the plurality of casings in spaced and adjacent relation to one another, e. a retaining means for maintaining the plurality of casings within said housing and formed thereon adjacent a periphery of said open face and extending the length thereof in substantially transverse relation to said plurality of channel means, f. an ejector assembly comprising a spring means for biasing the plurality of casings toward and out of the open face mounted within said housing in engageable biasing relation with an inner portion of the plurality of casings within said housing, g. said spring means comprising a plurality of spring elements secured to an inner surface of said base portion and extending outwardly therefrom and into engageable relation with each of the casings within separate ones of said plurality of channel means, each of said plurality of spring elements engaging at least one of said casings at a location with biases the one casing into either said retained position or said ejected position dependent on an opposing force being first applied to the casing along an outer, exposed portion thereof by said retaining means, h. said spring means disposed and said housing cooperatively dimensioned both relative to said plurality of casings to define an ejected position of the casings further defined by an extension of an outer portion of the casing beyond said retaining means and out of said open face.

15. An assembly as in claim 14 further comprising end panels removably interconnected to opposite peripheral ends of said base portion and said walls in spaced, parallel relation to one another.

16. An assembly as in claim 14 wherein said spring elements are integrally secured to said base portion and comprise an integral, one-piece construction therewith.

17. An assembly as in claim 14 wherein at least some of said spring elements are disposed to engage the inner portion of one casing at a location between the transverse center thereof and one end thereof disposed closest to said one wall associated with said retaining means.

18. An assembly as in claim 17 wherein at least some of said spring elements are disposed to engage the inner portion of one casing at a location between the transverse center thereof and one end thereof disposed farthest from said one wall associated with said retaining means.

19. An assembly as in claim 18 wherein said plurality of spring elements are each adjustably mounted on the inner surface of said base portion and selectively positionable along their length so as to vary the point of engagement of a distal free end of each spring element with the inner portion of a correspondingly positioned casing.

* * * * *